United States Patent
Zhang et al.

(10) Patent No.: US 9,565,570 B2
(45) Date of Patent: Feb. 7, 2017

(54) CAPACITY PLANNING METHOD AND DEVICE FOR WIRELESS BROADBAND NETWORK

(71) Applicant: ZTE Corporation, Shenzhen, Guangdong (CN)

(72) Inventors: Hai Zhang, Shenzhen (CN); Jun Gu, Shenzhen (CN); Jing Qi, Shenzhen (CN); Tao Lu, Shenzhen (CN); Jun Yan, Shenzhen (CN); Xi Chen, Shenzhen (CN); Guotian Fan, Shenzhen (CN); Kun Xu, Shenzhen (CN); Zhenming Zhu, Shenzhen (CN); Xudong Zhang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/406,407

(22) PCT Filed: Jun. 9, 2013

(86) PCT No.: PCT/CN2013/077113
§ 371 (c)(1),
(2) Date: Dec. 8, 2014

(87) PCT Pub. No.: WO2013/185602
PCT Pub. Date: Dec. 19, 2013

(65) Prior Publication Data
US 2015/0181439 A1      Jun. 25, 2015

(30) Foreign Application Priority Data
Jun. 13, 2012   (CN) .......................... 2012 1 0194408

(51) Int. Cl.
*H04W 72/00* (2009.01)
*H04B 7/00* (2006.01)
(Continued)

(52) U.S. Cl.
CPC ............. *H04W 16/18* (2013.01); *H04W 16/22* (2013.01); *H04W 24/06* (2013.01); *H04W 72/1263* (2013.01)

(58) Field of Classification Search
CPC ......................... H04W 52/343; H04W 52/346
(Continued)

(56) References Cited

U.S. PATENT DOCUMENTS 6,671,512 B2 * 12/2003 Laakso ............... H04W 52/346
                                                            455/450
7,308,268 B2    12/2007 Barbosa Da Torre
(Continued)

FOREIGN PATENT DOCUMENTS

CN   1553614 A   12/2004
CN   1596021 A   3/2005
(Continued)

OTHER PUBLICATIONS

Supplementary European Search Report in European application No. 13804989.5, mailed on Jan. 26, 2016.
(Continued)

*Primary Examiner* — William D Cumming
(74) *Attorney, Agent, or Firm* — Oppedahl Patent Law Firm LLC

(57) ABSTRACT

In a network constructed according to a network planning parameter, access scheduling is performed on a User Equipment UE in accordance with a type of a service of the UE; statistics on an indicator of performing access scheduling on the UE are acquired; and it is determined whether the indicator meets a requirement in network capacity planning; and when the indicator meets the requirement, a target planning parameter is determined as the network planning parameter; otherwise when the indicator does not meet the requirement, the network planning parameter is adjusted
(Continued)

until the indicator meets the requirement in network capacity planning. Network capacity for multiple services is planned according to service features, improving accuracy of network capacity planning.

18 Claims, 4 Drawing Sheets

(51) Int. Cl.
*H04B 15/00* (2006.01)
*H04W 16/18* (2009.01)
*H04W 24/06* (2009.01)
*H04W 72/12* (2009.01)
*H04W 16/22* (2009.01)

(58) Field of Classification Search
USPC .......................................... 455/450, 453, 509
See application file for complete search history.

(56) References Cited

U.S. PATENT DOCUMENTS

| | | | |
|---|---|---|---|
| 2003/0003921 A1* | 1/2003 | Laakso | H04W 52/343 455/453 |
| 2004/0214577 A1 | 10/2004 | Borst | |
| 2005/0097161 A1 | 5/2005 | Chiou | |
| 2007/0149186 A1 | 6/2007 | Barbosa Da Torre | |
| 2011/0242980 A1 | 10/2011 | Bader | |
| 2012/0122507 A1* | 5/2012 | Gao | H04B 7/024 455/509 |

FOREIGN PATENT DOCUMENTS

| | | |
|---|---|---|
| CN | 102227889 A | 10/2011 |
| CN | 102711129 A | 10/2012 |
| JP | 2010507280 A | 3/2010 |
| JP | 2011045091 A | 3/2011 |
| WO | 2008053552 A1 | 5/2008 |

OTHER PUBLICATIONS

International Search Report in international application No. PCT/CN2013/077113, mailed on Sep. 19, 2013.
English Translation of the Written Opinion of the International Search Authority in international application No. PCT/CN2013/077113, mailed on Sep. 19, 2013.

* cited by examiner

CAPACITY PLANNING METHOD AND DEVICE FOR WIRELESS BROADBAND NETWORK

TECHNICAL FIELD

The disclosure relates to the field of communication, and in particular to a method and device for planning capacity of a wireless broadband network.

BACKGROUND

A purpose of capacity planning is to arrive at a number of users that can be accommodated within a coverage, that is, to arrive at system capacity or the number of covered users. With a traditional capacity planning method, which is relatively simple, the system capacity is obtained via a ratio between cell capacity and a user rate in a scene, and then the number of covered users is obtained further via a traffic model. However, such capacity planning produces a user scale with certain limitations.

With the traditional method, first no feature in network operation is taken into account producing a static simple estimation by obtaining a current result according to an input parameter, instead of an optimized solution; secondly, multi-service-related capacity is estimated only by rough capacity superposition, without taking into account actual service characteristics; finally, no iterative estimation is performed according to different scenes, and no effect of network operation is reflected.

No effective solution has been proposed for accurate network capacity planning.

SUMMARY

Embodiments of the disclosure provide a method and device for planning capacity of a wireless broadband network, capable of implementing accurate network capacity planning.

One aspect of embodiments of the disclosure provides a method for planning capacity of a wireless broadband network. In a network constructed according to a network planning parameter, access scheduling is performed on a User Equipment UE in accordance with a type of a service of the UE. Statistics are acquired on an indicator of performing access scheduling on the UE. It is determined whether the indicator meets a requirement in network capacity planning. When the indicator meets the requirement, a target planning parameter is determined as the network planning parameter. Otherwise when the indicator does not meet the requirement, the network planning parameter is adjusted until the indicator meets the requirement in network capacity planning.

In an embodiment, the performing access scheduling on a UE in accordance with a type of a service of the UE may include: simulating a data flow of the service of the UE in accordance with the type of the service of the UE; allocating a resource for transmitting the data flow of the service of the UE in accordance with a pre-allocated Signal to Interference plus Noise Ratio SINR; and scheduling a UE in an access queue in accordance with a service priority of the UE and the allocated resource.

In an embodiment, the simulating a data flow of the service of the UE in accordance with the type of the service of the UE may include: randomly determining a time interval for transmitting a real-time service in a Transmission Time Interval TTI, and randomly determining an amount of data transmitted in the time interval; and determining, in accordance with a random distribution, an amount of data transmitted for a non-real-time service in a TTI.

In an embodiment, the scheduling a UE in an access queue in accordance with a service priority of the UE and the allocated resource may include: preferentially scheduling, in accordance with the allocated resource, a UE with a high service priority in UEs with different service priorities in the access queue; and scheduling UEs with a same service priority in the access queue in accordance with the allocated resource and an amount of historical data of a UE, by preferentially scheduling a UE with a small amount of historical data.

In an embodiment, before the allocating a resource for transmitting the data flow of the service of the UE in accordance with a pre-allocated SINR, distribution points of sample UEs may be generated in accordance with a preset cellular model. An SINR for a sample UE at each of the generated distribution points may be determined. A determined SINR for the UE may be selected.

In an embodiment, the generating distribution points of sample UEs in accordance with a preset cellular mode may include: generating the cellular model, and determining a boundary of a cell in the cellular model; and randomly generating distribution points of sample UEs within the boundary of the cell in the cellular model.

In an embodiment, the determining an SINR for a sample UE at each of the generated distribution points may include: determining the SINR of the sample UE at each of the generated distribution points in accordance with a formula U−SINR=S/I+N, wherein for an uplink SINR, the S is signal power received in a cell, the I is interference to the cell, and the N is a thermal noise in the cell; and for a downlink SINR, the S is signal power received by the sample UE, the I is interference to the sample UE, and the N is a thermal noise of the sample UE.

In an embodiment, the network planning parameter may include a station spacing in case of a known traffic or a traffic in case of a known station scale.

In an embodiment, the determining whether the indicator meets a requirement in network capacity planning may include: when the station scale of the network is to be planned in case of the known traffic, determining whether the indicator of performing access scheduling on the UE in a network constructed according to the station spacing meets the requirement in network capacity planning; and when the indicator meets the requirement, determining a target station spacing as the station spacing; otherwise when the indicator does not meet the requirement, adjusting the station spacing until the indicator meets the requirement in network capacity planning.

In an embodiment, the determining whether the indicator meets a requirement in network capacity planning may include: when the traffic of the network is to be planned in case of the known station scale, determining whether the indicator of performing access scheduling on the UE in a network constructed according to the traffic meets the requirement in network capacity planning; and when the indicator meets the requirement, determining a target traffic as the traffic; otherwise when the indicator does not meet the requirement, adjusting the traffic until the indicator meets the requirement in network capacity planning.

In an embodiment, after the target planning parameter is determined, in a network constructed according to the target planning parameter, access scheduling may be performed on the UE in accordance with the type of the service of the UE. Statistics on the indicator of performing access scheduling on the UE may be acquired.

In an embodiment, the indicator may include at least one of a cell flow, a cell edge spectral efficiency, a service satisfaction rate, and a number of served users.

Another aspect of embodiments of the disclosure provides a device for planning capacity of a wireless broadband network, including: a scheduling module configured for: in a network constructed according to a network planning parameter, performing access scheduling on a User Equipment UE in accordance with a type of a service of the UE; a statistics acquiring module configured for acquiring statistics on an indicator of performing access scheduling on the UE; and a processing module configured for: determining whether the indicator meets a requirement in network capacity planning; and when the indicator meets the requirement, determining a target planning parameter as the network planning parameter; otherwise when the indicator does not meet the requirement, adjusting the network planning parameter until the indicator meets the requirement in network capacity planning.

In an embodiment, the scheduling module may include: a simulating unit configured for simulating a data flow of the service of the UE in accordance with the type of the service of the UE; an allocating unit configured for allocating a resource for transmitting the data flow of the service of the UE in accordance with a pre-allocated Signal to Interference plus Noise Ratio SINR; and a scheduling unit configured for scheduling a UE in an access queue in accordance with a service priority of the UE and the allocated resource.

In an embodiment, the simulating unit may be configured for simulating the data flow of the service of the UE by: randomly determining a time interval for transmitting a real-time service in a Transmission Time Interval TTI, and randomly determining an amount of data transmitted in the time interval; and determining, in accordance with a random distribution, an amount of data transmitted for a non-real-time service in a TTI.

In an embodiment, the scheduling unit may be configured for scheduling the UE in the access queue by: preferentially scheduling, in accordance with the allocated resource, a UE with a high service priority in UEs with different service priorities in the access queue; and scheduling UEs with a same service priority in the access queue in accordance with the allocated resource and an amount of historical data of a UE, by preferentially scheduling a UE with a small amount of historical data.

In an embodiment, the scheduling module may further include: a generating unit configured for generating distribution points of sample UEs in accordance with a preset cellular model; a determining unit configured for determining an SINR for a sample UE at each of the generated distribution points; and a selecting unit configured for selecting a determined SINR for the UE.

In an embodiment, the network planning parameter may include a station spacing in case of a known traffic or a traffic in case of a known station scale.

In an embodiment, the processing module may be configured for: when the station scale of the network is to be planned in case of the known traffic, determining whether the indicator of performing access scheduling on the UE in a network constructed according to the station spacing meets the requirement in network capacity planning; and when the indicator meets the requirement, determining a target station spacing as the station spacing; otherwise when the indicator does not meet the requirement, adjusting the station spacing until the indicator meets the requirement in network capacity planning.

In an embodiment, the processing module may be configured for: when the traffic of the network is to be planned in case of the known station scale, determining whether the indicator of performing access scheduling on the UE in a network constructed according to the traffic meets the requirement in network capacity planning; and when the indicator meets the requirement, determining a target traffic as the traffic; otherwise when the indicator does not meet the requirement, adjusting the traffic until the indicator meets the requirement in network capacity planning.

In an embodiment, the indicator may include at least one of a cell flow, a cell edge spectral efficiency, a service satisfaction rate, and a number of served users.

With an embodiment of the disclosure, in a network constructed according to a current network planning parameter to be determined, access scheduling is performed on a UE in accordance with a type of a service of the UE; statistics on an indicator of performing access scheduling on the UE is acquired; and it is determined whether the indicator meets a requirement in network capacity planning; when the indicator meets the requirement, a target planning parameter is determined as the current network planning parameter; otherwise when the indicator does not meet the requirement, the network planning parameter is adjusted until the indicator meets the requirement in network capacity planning, thereby realizing multi-service-related network capacity planning according to a service nature, and increasing accuracy in network capacity planning.

DETAILED DESCRIPTION

The disclosure is to be elaborated below with reference to accompanying drawings and embodiments. Note that in case of no conflict, embodiments in the disclosure and characteristics in the embodiments may be combined with each other.

An embodiment of the disclosure provides a method for determining a network planning parameter, realizing accurate network capacity planning.

Figure 1:
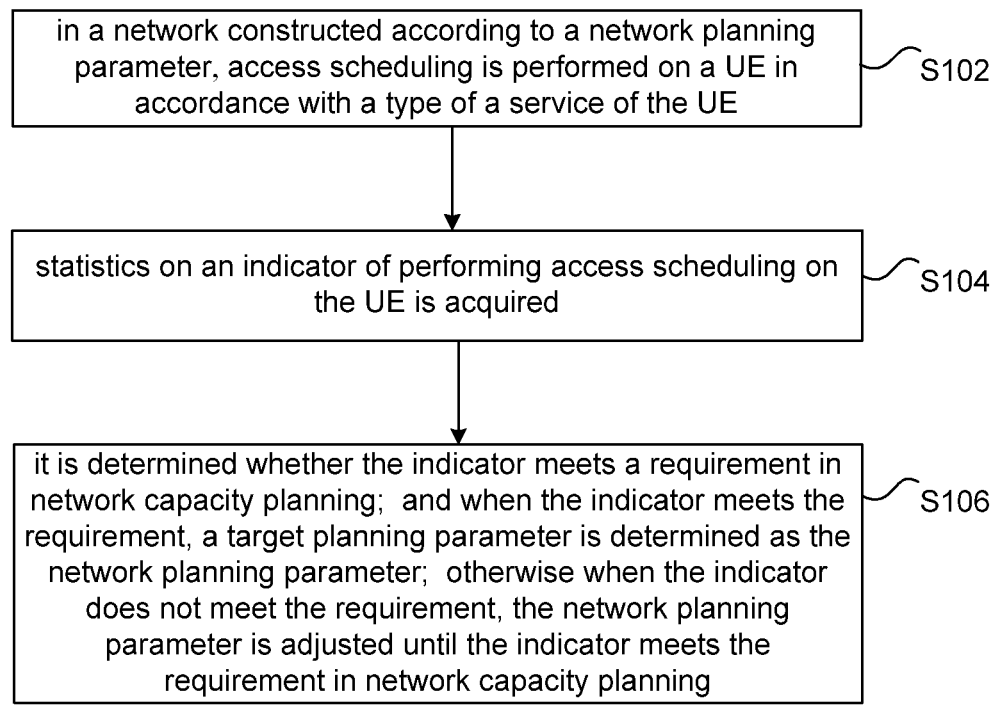
FIG. 1 is a flowchart of a method for planning capacity of a wireless broadband network according to an embodiment of the disclosure.

FIG. 1 is a flowchart of a method for planning capacity of a wireless broadband network according to an embodiment of the disclosure. As shown in FIG. 1, the method mainly includes step S102 to step S106.

In step S102, in a network constructed according to a network planning parameter, access scheduling is performed on a UE in accordance with a type of a service of the UE.

In step S104, statistics on an indicator of performing access scheduling on the UE is acquired.

In step S106, it is determined whether the indicator meets a requirement in network capacity planning; and when the indicator meets the requirement, a target planning parameter is determined as the network planning parameter; otherwise when the indicator does not meet the requirement, the network planning parameter is adjusted until the indicator meets the requirement in network capacity planning.

With an embodiment of the disclosure, in a network constructed according to a network planning parameter, access scheduling is performed on a UE in accordance with a type of a service of the UE; statistics on an indicator of performing access scheduling on the UE is acquired; and it is determined whether the indicator meets a requirement in network capacity planning; when the indicator meets the requirement, a target planning parameter is determined as the network planning parameter; otherwise when the indicator does not meet the requirement, the network planning parameter is adjusted until the indicator meets the requirement in network capacity planning, thereby realizing multi-service-related network capacity planning according to a service nature, and increasing accuracy in network capacity planning.

Requirements of different types of services on a delay and a rate differ. The data flow of the service of a UE in a TTI may be simulated according to a service nature, and a UE may be scheduled according to the service priority of the UE. According to an embodiment of the disclosure, in access scheduling of a UE in accordance with the type of the service of the UE, the data flow of the service of the UE may be simulated in accordance with the type of the service of the UE; a resource for transmitting the data flow of the service of the UE may be allocated in accordance with a pre-allocated Signal to Interference plus Noise Ratio SINR; and a UE in an access queue may be scheduled in accordance with a service priority of the UE and the allocated resource.

Further, data flows of different types of services are simulated differently. A session-type service with a high requirement on delay such as a voice call or a videophone has a stable rate, and produces a stable number of packets per unit time. A streaming service with a low requirement on delay such as webpage browsing has a rate fluctuating within a scope. According to an embodiment of the disclosure, in simulating the data flow of the service of a UE in accordance with the type of the service of the UE, a time interval for transmitting a real-time service in a Transmission Time Interval TTI may be randomly determined, and an amount of data transmitted in the time interval may be determined randomly; and an amount of data transmitted for a non-real-time service in a TTI may be determined in accordance with a random distribution. For example, the type of a service may be determined; when the service is a streaming service, an eligible amount of data per TTI may be generated in accordance with a random distribution; when the service is a session-type service, the interval for transmitting data of the session-type service, as well as the amount of data transmitted on the interval, is randomly generated.

When a packet for a UE is generated in a TTI, the UE may enter an access queue and wait for being scheduled. There are UEs with services of various priorities in an access queue. It should be ensured that a UE with a high service priority is scheduled first. UEs with the same service priority may be queued in ascending order of historical flows; the lower the historical flow, the higher the scheduling priority. According to an embodiment of the disclosure, in scheduling a UE in an access queue in accordance with the service priority of the UE and the allocated resource, a UE with a high service priority in UEs with different service priorities in the access queue may be preferentially scheduled in accordance with the allocated resource; and UEs with a same service priority in the access queue may be scheduled in accordance with the allocated resource and an amount of historical data of a UE, by preferentially scheduling a UE with a small amount of historical data. With the embodiment, resource allocation is performed for a UE to be scheduled in accordance with a pre-allocated SINR, and the UE is scheduled in accordance with the service priority of the UE to ensure that a UE with a high service priority is scheduled preferentially, thereby reflecting fairness of the scheduling.

In an actual application, the SINR for a UE may be acquired by collecting actual network data or by simulation. According to an embodiment of the disclosure, before the resource for transmitting the data flow of the service of a UE is allocated in accordance with a pre-allocated SINR, the SINR for a UE may be obtained by simulation. In an embodiment, distribution points of sample UEs may be generated in accordance with a preset cellular model; an SINR for a sample UE at each of the generated distribution points may be determined; and a determined SINR may be allocated to the UE. Further, in generating distribution points of sample UEs in accordance with a preset cellular model, the cellular model may be generated, a boundary of a cell in the cellular model may be determined; and distribution points of sample UEs within the boundary of the cell in the cellular model may be generated randomly.

In an embodiment, the more sample UEs in a cellular model there are, the more accurate a determined SINR will be. Namely, the more sampling points there are, the more accurate the result will be. An SINR probability distribution curve may be generated according to multiple SINRs. An SINR for a UE accessing a network may be selected randomly from determined SINRs. In an embodiment, sampled SINRs are allocated to all calling users according to the SINR probability distribution. For example, projections of points of the SINR probability distribution curve (cumulative distribution function, CDF) on a vertical axis are uniform discrete points, SINRs corresponding to which are allocated to users calling at the same time. For example, there are 10 calling users, for each of which an SINR is to be allocated; there are 1000 sampled SINRs; an SINR extracted at an interval of 100 SINRs is allocated to a calling user. The allocated SINR is the actual SINR for the UE in simulation.

According to an embodiment of the disclosure, an SINR for a sample UE at a generated distribution point may be determined in accordance with a formula U−SINR=S/I+N. For an uplink SINR, the S is signal power received in a cell, the I is interference to the cell, and the N is a thermal noise in the cell; and for a downlink SINR, the S is signal power received by the sample UE, the I is interference to the sample UE, and the N is a thermal noise of the sample UE.

In an embodiment of the disclosure, there are three scenes in network capacity planning. 1) In case of a known station scale of a network, the traffic of the network, namely, the number of users of the network, is planned. 2) In case of a known traffic of a network, the station scale of the network is planned; in a determined network planning area, to plan the station scale is to plan the station spacing. 3) In case that both the station scale and the traffic of a network are known, statistics on various indicators of the network may be acquired. In an embodiment of the disclosure, the network planning parameter may include a station spacing in case of a known traffic and/or a traffic in case of a known station scale. Embodiments of the three scenes are described below respectively.

In determining whether the indicator of performing access scheduling on a UE meets a requirement in network capacity planning, when the station scale of the network is to be planned in case of the known traffic, it may be determined whether the indicator of performing access scheduling on the UE in a network constructed according to the station spacing meets the requirement in network capacity planning; and when the indicator meets the requirement, a target station spacing may be determined as the station spacing; otherwise when the indicator does not meet the requirement, the station spacing may be adjusted until the indicator of performing access scheduling on each UE meets the requirement in network capacity planning.

For example, in case of a known area to be planned, in station scale planning, an indicator of a network may be verified under different station spacings by simulating UE access scheduling and acquiring statistics on an indicator of UE access scheduling, such as a call loss and a blocking rate. When the current station spacing cannot meet the requirement in network capacity planning, station spacing may be adjusted until the requirement in network capacity planning is met. For example, after the station spacing is adjusted, coverage of the network is greater than a preset value, in which case the station spacing may serve as a station spacing for network planning, namely, the target station spacing, thereby accomplishing station scale planning.

In determining whether an indicator of performing access scheduling on each UE meets the requirement in network capacity planning, when the traffic of the network is to be planned in case of a known station scale, it may be determined whether the indicator of performing access scheduling on each UE in a network constructed according to the to current traffic meets the requirement in network capacity planning; when the indicator meets the requirement, a target traffic may be determined as the current traffic; otherwise when the indicator does not meet the requirement, the traffic may be adjusted until the indicator meets the requirement in network capacity planning.

For example, in a known network, the number of users can be accommodated in the network is determined. Given an input number of users, it may be determined whether an indicator of the network meets a preset condition. For example, it may be determined, with the given number of users, whether a success rate of user access is greater than a designed success rate. When the success rate of user access is greater than the designed success rate, the given number of users may serve as the number of users of the network. When the success rate of user access is no greater than the designed success rate, the number of users may be adjusted until a target design indicator is met.

After the target planning parameter is determined, in a network constructed according to the target planning parameter, access scheduling may be performed on the UE in accordance with the type of the service of the UE; and statistics on the indicator of performing access scheduling on the UE may be acquired. Network performance may be assessed according to acquired statistics on the indicator.

In an embodiment of the disclosure, the indicator may include, but is not limited to, at least one of: a cell flow, a cell edge spectral efficiency, a service satisfaction rate, and a number of served users. For example, it may be determined whether the success rate of UE access meets a planned target success rate.

According to an embodiment of the disclosure, in accordance with the method for planning capacity of a wireless broadband network, a device for planning capacity of a wireless broadband network is further provided to realize the method.

Figure 2:
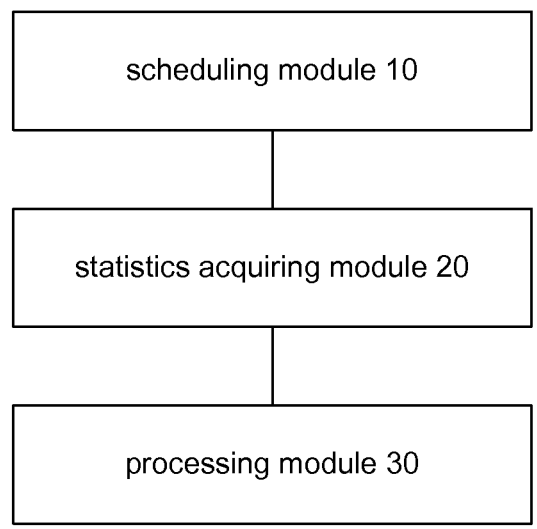
FIG. 2 is a block diagram of a structure of a device for planning capacity of a wireless broadband network according to an embodiment of the disclosure.

FIG. 2 is a block diagram of a structure of a device for planning capacity of a wireless broadband network according to an embodiment of the disclosure. As shown in FIG. 2, the device mainly includes a scheduling module 10, a statistics acquiring module 20 and a processing module 30. The scheduling module 10 is configured for: in a network constructed according to a network planning parameter, performing access scheduling on a User Equipment UE in accordance with a type of a service of the UE; the statistics acquiring module 20 is coupled with the scheduling module 10 and is configured for acquiring statistics on an indicator of performing access scheduling on the UE; the processing module 30 is coupled with the statistics acquiring module 20 and is configured for: determining whether the indicator meets a requirement in network capacity planning; and when the indicator meets the requirement, determining a target planning parameter as the network planning parameter; otherwise when the indicator does not meet the requirement, adjusting the network planning parameter until the indicator meets the requirement in network capacity planning.

With an embodiment of the disclosure, the scheduling module 10 performs, in a network constructed according to a network planning parameter, access scheduling on a User Equipment UE in accordance with a type of a service of the UE; the statistics acquiring module 20 acquires statistics on an indicator of performing access scheduling on the UE; the processing module 30 determines whether the indicator meets a requirement in network capacity planning; and determines a target planning parameter as the network planning parameter when the indicator meets the requirement; otherwise when the indicator does not meet the requirement, adjusts the network planning parameter until the indicator meets the requirement in network capacity planning, thereby realizing multi-service-related network capacity planning according to a service nature, and increasing accuracy in network capacity planning.

Figure 3:
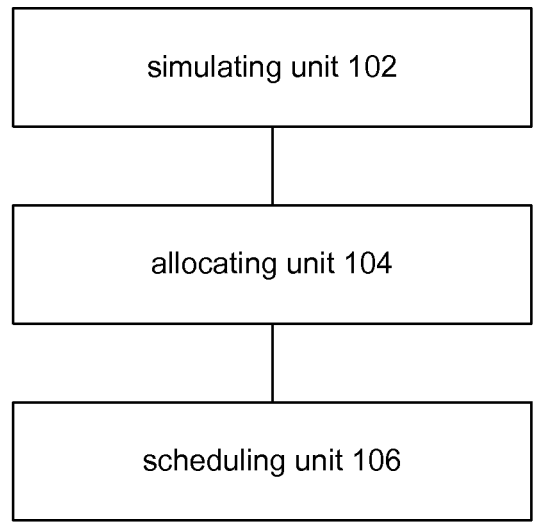
FIG. 3 is a block diagram of a structure of a scheduling module according to an embodiment of the disclosure.

Requirements of different types of services on a delay and a rate differ. The data flow of the service of a UE in a TTI may be simulated according to a service nature, and a UE may be scheduled according to the service priority of the UE. In access scheduling of a UE in accordance with the type of the service of the UE, the data flow of the service of the UE may be simulated in accordance with the type of the service of the UE; a resource for transmitting the data flow of the service of the UE may be allocated in accordance with a pre-allocated SINR; and a UE in an access queue may be scheduled in accordance with a service priority of the UE and the allocated resource. Therefore, according to an embodiment of the disclosure, as shown in FIG. 3, the scheduling module 10 may include: a simulating unit 102 configured for simulating a data flow of the service of the UE in accordance with the type of the service of the UE; an allocating unit 104 coupled with the simulating unit 102 and configured for allocating a resource for transmitting the data flow of the service of the UE in accordance with a pre-allocated SINR; a scheduling unit 106 coupled with the allocating unit 104 and configured for scheduling a UE in an access queue in accordance with a service priority of the UE and the allocated resource.

Further, data flows of different types of services are simulated differently. A session-type service with a high requirement on delay such as a voice call or a videophone has a stable rate, and produces a stable number of packets per unit time. A streaming service with a low requirement on delay such as webpage browsing has a rate fluctuating within a scope. Therefore, according to an embodiment of the disclosure, the simulating unit 102 may be configured for simulating the data flow of the service of the UE by: randomly determining a time interval for transmitting a real-time service in a TTI, and randomly determining an amount of data transmitted in the time interval; and determining, in accordance with a random distribution, an amount of data transmitted for a non-real-time service in a TTI.

When a packet for a UE is generated in a TTI, the UE may enter an access queue and wait for being scheduled. There are UEs with services of various priorities in an access queue. It should be ensured that a UE with a high service priority is scheduled first. UEs with the same service priority may be queued in ascending order of historical flows; the lower the historical flow, the higher the scheduling priority. Therefore, according to an embodiment of the disclosure, the scheduling unit 106 may be configured for scheduling the UE in the access queue by: preferentially scheduling, in accordance with the allocated resource, a UE with a high service priority in UEs with different service priorities in the access queue; and scheduling UEs with a same service priority in the access queue in accordance with the allocated resource and an amount of historical data of a UE, by preferentially scheduling a UE with a small amount of historical data.

Figure 4:
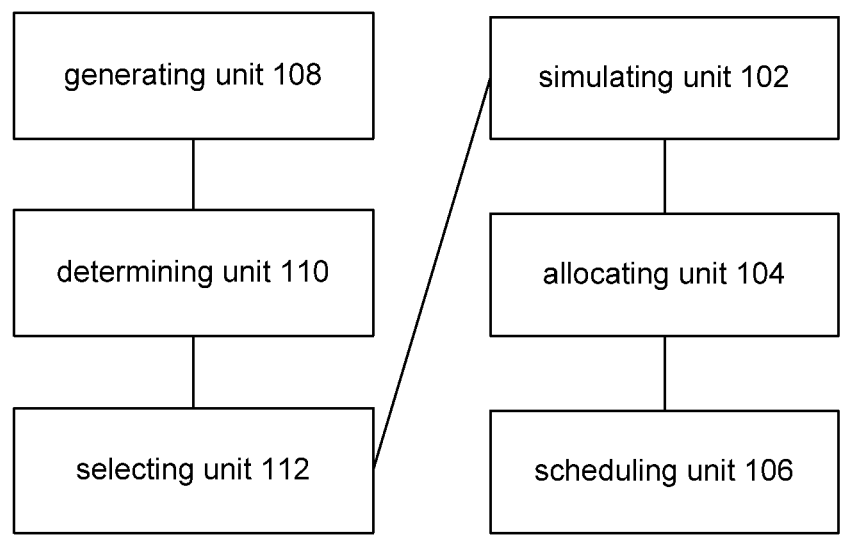
FIG. 4 is a block diagram of a structure of a scheduling module according to an embodiment of the disclosure.

In an actual application, the SINR for a UE may be acquired by collecting actual network data or by simulation. According to an embodiment of the disclosure, before the resource for transmitting the data flow of the service of a UE is allocated in accordance with a pre-allocated SINR, the SINR for a UE may be obtained by simulation. Therefore, as shown in FIG. 4, the scheduling module may further include: a generating unit 108 configured for generating distribution points of sample UEs in accordance with a preset cellular model; a determining unit 110 coupled with the generating unit 108 and configured for determining an SINR for a sample UE at each of the generated distribution points; and a selecting unit 112 coupled with the determining unit 110 and configured for selecting a determined SINR for the UE.

Further, the determining unit 110 may determine an SINR for a sample UE at each of the generated distribution points in accordance with a formula U−SINR=S/I+N. For an uplink SINR, the S is signal power received in a cell, the I is interference to the cell, and the N is a thermal noise in the cell; and for a downlink SINR, the S is signal power received by the sample UE, the I is interference to the sample UE, and the N is a thermal noise of the sample UE.

In an embodiment of the disclosure, there are three scenes in network capacity planning. 1) In case of a known station scale of a network, the traffic of the network, namely, the number of users of the network, is planned. 2) In case of a known traffic of a network, the station scale of the network is planned; in a determined network planning area, to plan the station scale is to plan the station spacing. 3) In case that both the station scale and the traffic of a network are known, statistics on various indicators of the network may be acquired. In an embodiment of the disclosure, the network planning parameter may include a station spacing in case of a known traffic and/or a traffic in case of a known station scale. In an embodiment of the disclosure, the indicator may include, but is not limited to, at least one of: a cell flow, a cell edge spectral efficiency, a service satisfaction rate, and a number of served users. For example, it may be determined whether the success rate of UE access meets a planned target success rate.

Embodiments of the three scenes are described below respectively.

1) The processing module 30 may be configured for: in determining whether the indicator of performing access scheduling on a UE meets a requirement in network capacity planning, when the station scale of the network is to be planned in case of the known traffic, determining whether the indicator of performing access scheduling on the UE in a network constructed according to the station spacing meets the requirement in network capacity planning; and when the indicator meets the requirement, determining a target station spacing as the station spacing; otherwise when the indicator does not meet the requirement, adjusting the station spacing until the indicator of performing access scheduling on each UE meets the requirement in network capacity planning.

2) The processing module 30 may be configured for: in determining whether an indicator of performing access scheduling on each UE meets the requirement in network capacity planning, when the traffic of the network is to be planned in case of a known station scale, determining whether the indicator of performing access scheduling on each UE in a network constructed according to the current traffic meets the requirement in network capacity planning; when the indicator meets the requirement, determining a target traffic as the current traffic; otherwise when the indicator does not meet the requirement, adjusting the traffic until the indicator meets the requirement in network capacity planning.

3) After the target planning parameter is determined, the processing module 30 may further be configured for: in a network constructed according to the target planning parameter, performing access scheduling on the UE in accordance with the type of the service of the UE; and acquiring statistics on the indicator of performing access scheduling on the UE. Network performance may be assessed according to acquired statistics on the indicator.

Embodiment 1

According to an embodiment of the disclosure, given that traditional capacity planning fails to guarantee planning quality and application to multiple scenes, a new capacity planning method is provided as follows. An an iterated indicator is determined by scene analysis, an SINR probability distribution curve based on a standard cellular model is computed, UE SINRs in one snapshot are allocated, access scheduling is simulated according to a service nature, the result of a current snapshot is acquired, and an eligible planned result is acquired according to capacity planning requirements in different scenes. Accuracy in wireless network capacity planning is thus increased, providing guidance for network configuration in planning and design.

Figure 5:
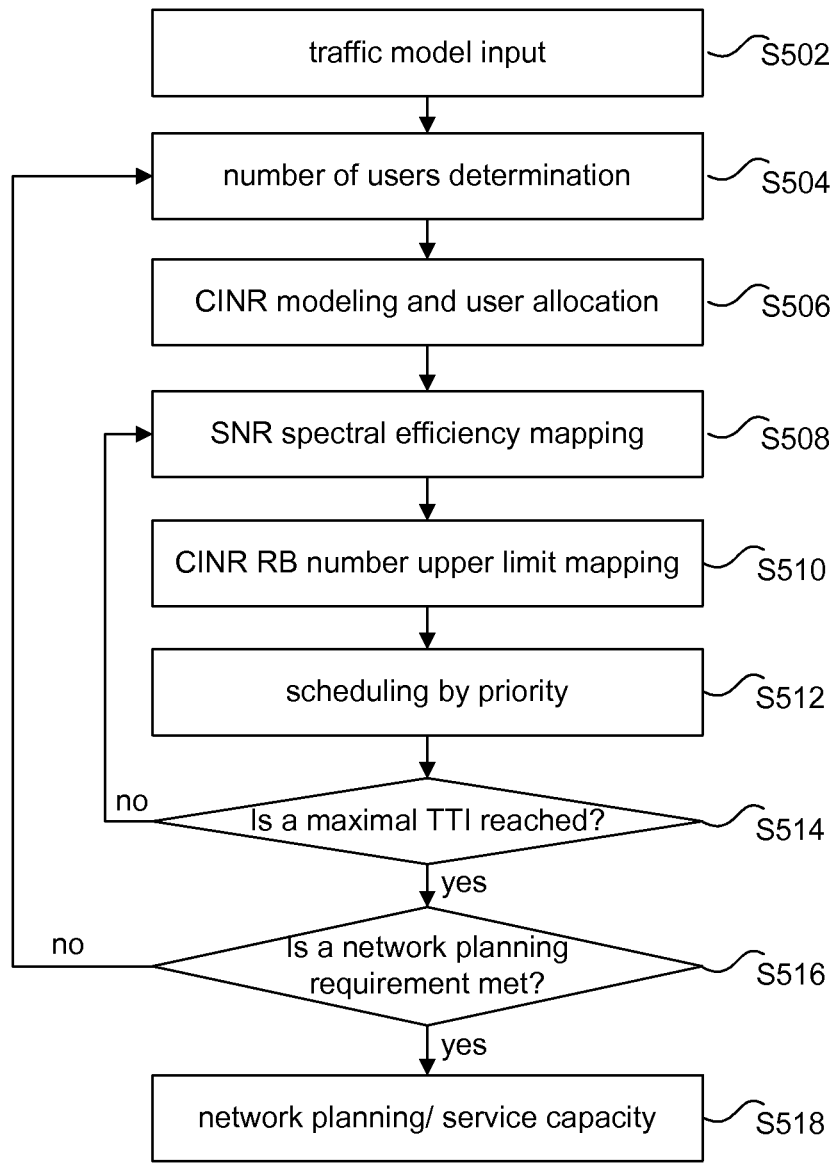
FIG. 5 is a flowchart of a method for planning capacity of a wireless broadband network according to Embodiment 1 of the disclosure.

In an embodiment of the disclosure, an example of planning the number of users, namely, the traffic, is described. A capacity planning contains multiple snapshots, and an iterated indicator is increased by one step in each snapshot. The flow of one snapshot is as shown in FIG. 5. The method may include step S502 to step S518.

In step S502, a traffic model is input.

In step S504, a current number of users is determined.

In step S506, CINR modeling and user allocation is performed.

In step S508, SNR spectral efficiency mapping is performed.

In step S510, CINR and RB number upper limit mapping is performed.

In step S512, a scheduling-by-priority algorithm is run.

In step S514, it is determined whether a maximal TTI is reached; when a maximal TTI is reached, the flow goes to step S516; when a maximal TTI is not reached, the flow returns to step S508.

In step S516, it is determined whether the current number of users meets a network planning requirement; and when the number of users meets the network planning requirement, the flow goes to step S518; otherwise when the number of users fails to meet the network planning requirement, the flow returns to step S504.

In step S518, the current number of users is determined as the target number of users.

In an embodiment, the method may include step 1 to step 7.

In step 1, a planning scene is determined. In an embodiment of the disclosure, capacity planning applications may be divided into three scenes. The first scene involves station scale estimation. The second scene involves user scale estimation, the third scene involves acquisition of statistics on various indicators of the network given that the station configuration and the user configuration are known. Criterions for iteration differ with different scenes.

In step 2, a traffic distribution is generated. For example, distribution of a large number of UEs in a cell, used in computing typical SINRs, is generated according to a typical cellular model scene.

In step 3, an SINR distribution curve is generated. Uplink and downlink SINR indicators are computed respectively according to the UE distribution. The SINR distribution curve is generated by interpolation according to limited SINR points.

In step 4, SINR allocation for UEs to be planned is performed. The more UEs for generating the SINR distribution curve, the more precise is an SINR in the curve. The UEs to be planned are of the number of UEs input in simulation or the number of UEs to be calculated.

In step 5, a data flow of a service is generated. There is a requirement of a type of services on both the delay and the rate. A flow of a size has to be generated according to a service nature. An access queue waiting for system scheduling is maintained during a TTI.

In step 6, resource scheduling and allocation is performed. There is a queue waiting to be granted access in each TTI. A UE is granted access according to a scheduling strategy. Meanwhile, fairness of the scheduling has to be reflected, such that each UE can be served by the network. Resource allocation is performed according to an SINR-corresponding RB number.

In step 7, statistics on the result of the current scene snapshot are acquired. Indicator analysis is performed according to different scenes. Acquired statistics mainly include calculation of an indicator such as a cell flow, an SE, an access satisfaction rate, and a cell edge flow.

With embodiments of the disclosure, precise method for computing system capacity is realized. Capacity planning is performed by combining an actual feature in network operation and an actual service nature, ensuring quality of wireless network communication, widening scenes to which capacity planning applies, and improving efficiency of planning personnel, thereby raising the level of wireless network capacity planning.

Embodiment 2

The method for planning capacity of a wireless broadband network may be described with an example of capacity planning according to a typical cellular model scene.

The method may include step 1 to step 7.

In step 1, a planning scene is determined.

There may be three service scenes in capacity planning.

In the first scene, a station scale is known, and a traffic is unknown and has to be estimated. Iteration has to be performed on the traffic (namely, the number of users). A user scale changes snapshot by snapshot. Network service capacity changes as the user scale increases, and will eventually achieve balanced network capacity in line with the actual situation.

In the second scene, a traffic is known; a station scale is unknown, and is simulated and output. The flow here is about the same as in the first scene except that an iterated indicator now is a station spacing. That is, the station spacing changes snapshot by snapshot.

In the third scene, both the station scale and the service capacity are known, and various items required in the scene are simulated without iteration.

In step 2, a traffic distribution is generated. That is, UEs are distributed according to a typical cellular model for computing uplink and downlink SINRs. A large number of sample SINRs are generated. The specific process is as follows.

A typical cellular model is generated. A boundary of a cell in the cellular model is determined. UE coordinates are generated randomly within the boundary of the cell to acquire UE distribution points. A number of UEs in a sector in a cluster is determined. The same number of UEs are spread in each sector. Considering N UEs, as downlink interference only comes from a base station, for the downlink case N points are spread within a central cluster. For the uplink case, as the SINR for a UE in the central cluster has to be computed and uplink interference may come from UEs in each cluster, points may be spread in all clusters, with N points in each cluster.

In step 3, an SINR distribution curve is generated. After the UE positions are determined, the uplink and downlink SINRs may be derived according to a formula for computing a signal strength.

A formula for computing the uplink and downlink SINRs is as follows: $U-SINR=S/I+N$. An uplink SINR and a downlink SINR are computed with the same formula, with different meanings of S and I. In computing an uplink SINR, the S is signal power received in a cell, and the N is a thermal noise in the cell. In computing a downlink SINR, the S is signal power received by the UE, and the N is a thermal noise of the UE.

At the same time, in the formula, the I for computing an uplink SINR differs from that for computing a downlink SINR. The uplink I refers to interference originated from UEs (here considering only interference to a cell in the central cluster). Assume that a primary cell of a UE in the central cluster is a Cell A; there are seven clusters in a cellular model, each cluster having 21 cells with the same naming, i.e., cells A, B, C, . . . , and U in cluster 1, cells A, B, C, . . . , and U in cluster 2, etc. In computing interference, only power of UEs in cells B, C, D, . . . , and U in all clusters received in Cell A is computed.

Consider an example of cell B. First, a UE is selected randomly from cells B of all clusters as interfering UEs. Then, large-scale fadings of the interfering UEs to Cell A of the central cluster are computed. Finally, the maximal signal power value thereof is selected as the interference to Cell A by an interfering UE in cell B. Uplink interference is a sum of values of all 21 cells.

Downlink I refers to interference originated from large-scale fadings of cells of the same name in all clusters to the UE. The maximal value thereof is the large-scale fading of the cell to the UE. The downlink I is the total received power of the 21 cells apart from the primary cell where the UE is located.

In step 4, SINR allocation is performed. Sampled SINRs are allocated to all calling users according to the SINR probability distribution. That is, projections of points of the SINR CDF curve on a vertical axis are uniform discrete points, SINRs corresponding to which are allocated to users calling at the same time. For example, there are 10 calling users, for each of which an SINR is to be allocated; there are 1000 sampled SINRs; a sampled SINR extracted at an interval of 100 sampled SINRs is allocated to a calling user. The allocated SINR is the actual SINR for the UE in simulation. The more sampling points there are, the more accurate the result will be.

In step 5, a data flow of a service is generated. Data flows of different services are generated differently. A session-type service with a high requirement on delay is mainly characterized by a stable service rate and a stable number of packets produced per unit time. A streaming service with no requirement on delay has a rate fluctuating within a scope. In generating a data flow of a service, a service nature has to be determined first. When the service is a streaming service, an eligible amount of data per TTI may be generated in accordance with a random distribution. When the service is a session-type service, a packet interval meeting the delay requirement of the service is generated randomly, and then a packet size at the interval is generated.

In step 6, resource scheduling and allocation is performed. For a service of a UE, when a packet is generated in a TTI, the UE will enter an access queue and wait for being scheduled.

Figure 6:
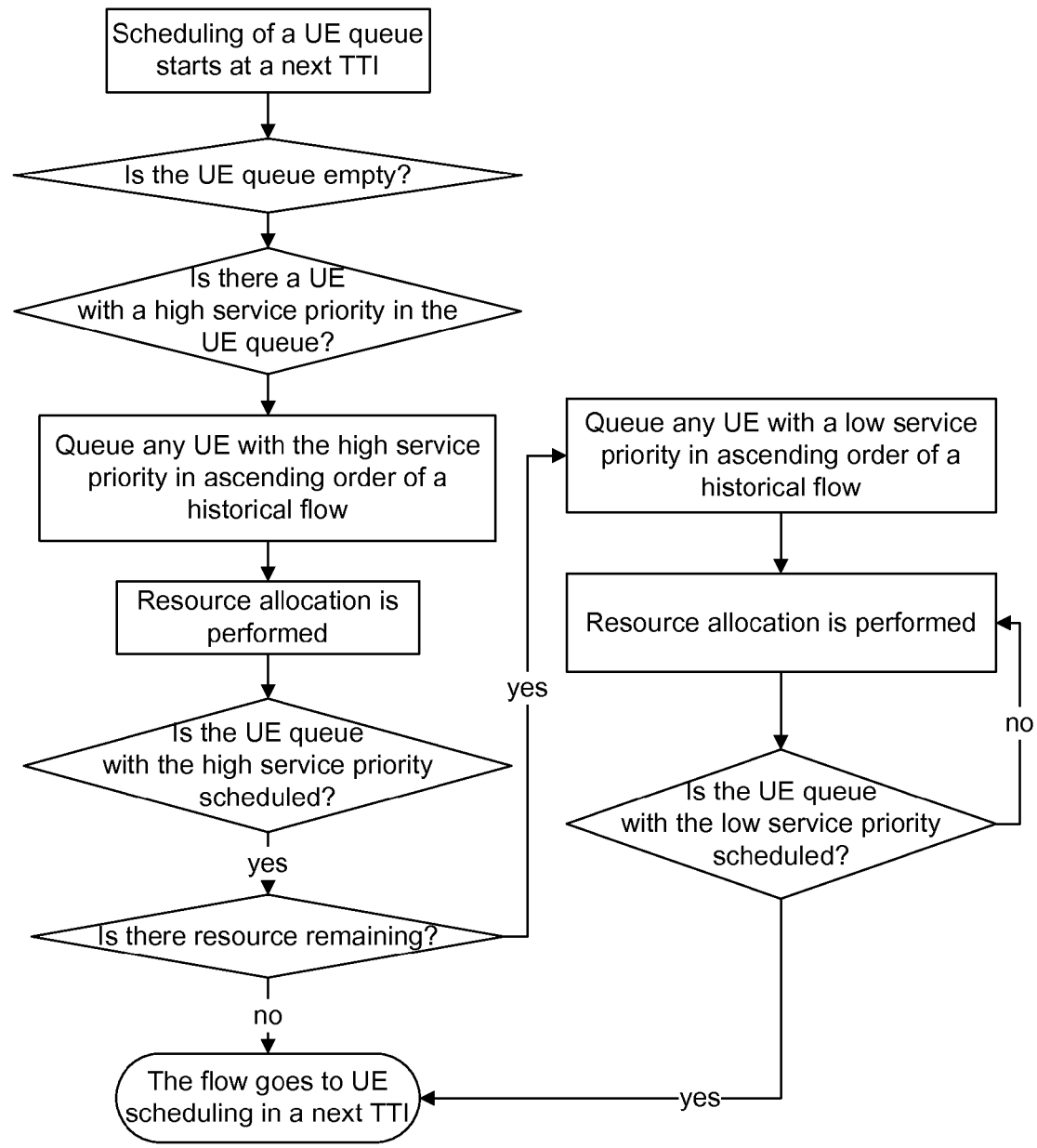
FIG. 6 is a flowchart of a UE scheduling method according to Embodiment 2 of the disclosure.

Here, There are UEs with services of various priorities in an access queue. FIG. 6 is a flowchart of a UE scheduling method according to Embodiment 2 of the disclosure, showing details of the step. As shown in FIG. 6, first it is ensured that a UE with a high service priority is scheduled first. UEs with the same service priority may be queued in ascending order of historical flows. The lower the historical flow, the higher the scheduling priority.

By scheduling a UE to have a flow size in accordance with an allocated SINR, it is ensured that a UE with a high service priority acquires resources first, and a UE with a low service priority is queued to acquire resources later, reflecting certain fairness of the scheduling.

In step 7, indicator statistics on a current iteration are acquired. The flow of traffic distribution, SINR allocation, access scheduling, etc. is repeated. At the same time, it is determined whether indicator iteration and step size updating is performed according to a service scene. The iterated indicator may include a cell flow, a cell edge spectral efficiency, a service satisfaction rate, and a number of served users commonly used. For the first scene, the iterated indicator may further include the number of users. For the second scene, the iterated indicator may further include the number of stations.

With embodiments of the disclosure, in a planning design stage, capacity indicator design may be performed on an area to be planned by combining a way of planning and a service nature to guarantee a more reasonable network planning parameter, avoiding uncertainty in a planned result brought by a monotonic way of capacity planning and simplistic service modeling in a traditional mode.

It thus may be seen that with embodiments of the disclosure, in a network constructed according to a network planning parameter, access scheduling is performed on a UE in accordance with a type of a service of the UE; statistics on an indicator of performing access scheduling on the UE is acquired; and it is determined whether the indicator meets a requirement in network capacity planning; and when the indicator meets the requirement, a target planning parameter is determined as the network planning parameter; otherwise when the indicator does not meet the requirement, the network planning parameter is adjusted until the indicator meets the requirement in network capacity planning. Multi-service-related network capacity is planned according to a service nature, realizing precise computation of the system capacity. Capacity planning is performed by combining an actual feature in network operation and an actual service nature, increasing accuracy in network capacity planning, ensuring quality of wireless network communication, widening scenes to which capacity planning applies, and improving efficiency of planning personnel, thereby raising the level of wireless network capacity planning.

Apparently, those skilled in the art will know that modules or steps in embodiments of the disclosure may be realized using a universal computing device, and may be integrated in a single computing device or distributed in a network formed by multiple computing devices. Optionally, they may be realized using computing device executable program codes, and thus may be stored in a storage device and executed by a computing device. In some cases, the steps may be executed in an order different from that illustrated or described here, or may each be made into an Integrated to Circuit module. Multiple modules or steps herein may be realized by being made into a single Integrated Circuit module. Thus, an embodiment of the disclosure is not limited to a specific combination of hardware and software.

What described are embodiments of the disclosure. Note that those skilled in the art may make various modification and variations without departing from the principle of the disclosure. Such modification and variations also fall in the protection scope of the disclosure.

INDUSTRIAL APPLICABILITY

With embodiments of the disclosure, in a network constructed according to a network planning parameter, access scheduling is performed on a UE in accordance with a type of a service of the UE; statistics on an indicator of performing access scheduling on the UE is acquired; and a target planning parameter is determined by determined whether the indicator meets a requirement in network capacity planning, until the indicator meets the requirement in network capacity planning. With an embodiment of the disclosure, multi-service-related network capacity is planned according to a service nature, increasing accuracy in network capacity planning.

The invention claimed is:

1. A method for planning capacity of a wireless broadband network, comprising:
   in a network constructed according to a network planning parameter, performing access scheduling on a User Equipment UE in accordance with a type of a service of the UE;
   acquiring statistics on an indicator of performing access scheduling on the UE; and
   determining whether the indicator meets a requirement in network capacity planning; and when the indicator meets the requirement, determining a target planning parameter as the network planning parameter; otherwise when the indicator does not meet the requirement, adjusting the network planning parameter until the indicator meets the requirement in network capacity planning, wherein the performing access scheduling on a UE in accordance with a type of a service of the UE comprises:

simulating a data flow of the service of the UE in accordance with the type of the service of the UE;

allocating a resource for transmitting the data flow of the service of the UE in accordance with a pre-allocated Signal to Interference plus Noise Ratio SINR; and scheduling a UE in an access queue in accordance with a service priority of the UE and the allocated resource, wherein the simulating a data flow of the service of the UE in accordance with the type of the service of the UE comprises:

randomly determining a time interval for transmitting a real-time service in a Transmission Time Interval TTI, and randomly determining an amount of data transmitted in the time interval; and determining, in accordance with a random distribution, an amount of data transmitted for a non-real-time service in a TTI.

2. The method according to claim 1, wherein the scheduling a UE in an access queue in accordance with a service priority of the UE and the allocated resource comprises:

preferentially scheduling, in accordance with the allocated resource, a UE with a high service priority in UEs with different service priorities in the access queue; and scheduling UEs with a same service priority in the access queue in accordance with the allocated resource and an amount of historical data of a UE, by preferentially scheduling a UE with a small amount of historical data.

3. The method according to claim 1, further comprising: before the allocating a resource for transmitting the data flow of the service of the UE in accordance with a pre-allocated SINR, generating distribution points of sample UEs in accordance with a preset cellular model;

determining an SINR for a sample UE at each of the generated distribution points; and selecting a determined SINR for the UE.

4. The method according to claim 3, wherein the generating distribution points of sample UEs in accordance with a preset cellular model comprises:

generating the preset cellular model, and determining a boundary of a cell in the preset cellular model; and randomly generating distribution points of sample UEs within the boundary of the cell in the preset cellular model.

5. The method according to claim 3, wherein the determining an SINR for a sample UE at each of the generated distribution points comprises:

determining the SINR of the sample UE at each of the generated distribution points in accordance with a formula U−SINR=S/I+N, wherein for an uplink SINR, the S is signal power received in a cell, the I is interference to the cell, and the N is a thermal noise in the cell; and for a downlink SINR, the S is signal power received by the sample UE, the I is interference to the sample UE, and the N is a thermal noise of the sample UE.

6. The method according to claim 1, wherein the determining whether the indicator meets a requirement in network capacity planning comprises: when the station scale of the network is to be planned in case of the known traffic, determining whether the indicator of performing access scheduling on the UE in a network constructed according to the station spacing meets the requirement in network capacity planning; and when the indicator meets the requirement, determining a target station spacing as the station spacing; otherwise when the indicator does not meet the requirement, adjusting the station spacing until the indicator meets the requirement in network capacity planning.

7. The method according to claim 1, wherein the determining whether the indicator meets a requirement in network capacity planning comprises: when the traffic of the network is to be planned in case of the known station scale, determining whether the indicator of performing access scheduling on the UE in a network constructed according to the traffic meets the requirement in network capacity planning; and when the indicator meets the requirement, determining a target traffic as the traffic; otherwise when the indicator does not meet the requirement, adjusting the traffic until the indicator meets the requirement in network capacity planning.

8. The method according to claim 1, further comprising: after the target planning parameter is determined, in a network constructed according to the target planning parameter, performing access scheduling on the UE in accordance with the type of the service of the UE; and acquiring statistics on the indicator of performing access scheduling on the UE.

9. The method according to claim 1, wherein the indicator comprises at least one of a cell flow, a cell edge spectral efficiency, a service satisfaction rate, and a number of served users.

10. A non-transitory computer-readable storage medium having stored therein instructions that, when executed by a processor, cause the processor to perform a method for planning capacity of a wireless broadband network, the method comprising:

in a network constructed according to a network planning parameter, performing access scheduling on a User Equipment UE in accordance with a type of a service of the UE;

acquiring statistics on an indicator of performing access scheduling on the UE; and determining whether the indicator meets a requirement in network capacity planning; and when the indicator meets the requirement, determining a target planning parameter as the network planning parameter; otherwise when the indicator does not meet the requirement, adjusting the network planning parameter until the indicator meets the requirement in network capacity planning, wherein the performing access scheduling on a UE in accordance with a type of a service of the UE comprises:

simulating a data flow of the service of the UE in accordance with the type of the service of the UE;

allocating a resource for transmitting the data flow of the service of the UE in accordance with a pre-allocated Signal to Interference plus Noise Ratio SINR; and scheduling a UE in an access queue in accordance with a service priority of the UE and the allocated resource, wherein the simulating a data flow of the service of the UE in accordance with the type of the service of the UE comprises:

randomly determining a time interval for transmitting a real-time service in a Transmission Time Interval TTI, and randomly determining an amount of data transmitted in the time interval; and determining, in accordance with a random distribution, an amount of data transmitted for a non-real-time service in a TTI.

11. A device for planning capacity of a wireless broadband network, comprising:
a scheduling module configured for: in a network constructed according to a network planning parameter, performing access scheduling on a User Equipment UE in accordance with a type of a service of the UE;
a statistics acquiring module configured for acquiring statistics on an indicator of performing access scheduling on the UE; and
a processing module configured for: determining whether the indicator meets a requirement in network capacity planning; and when the indicator meets the requirement, determining a target planning parameter as the network planning parameter; otherwise when the indicator does not meet the requirement, adjusting the network planning parameter until the indicator meets the requirement in network capacity planning,
wherein the scheduling module comprises:
a simulating unit configured for simulating a data flow of the service of the UE in accordance with the type of the service of the UE;
an allocating unit configured for allocating a resource for transmitting the data flow of the service of the UE in accordance with a pre-allocated Signal to Interference plus Noise Ratio SINR; and
a scheduling unit configured for scheduling a UE in an access queue in accordance with a service priority of the UE and the allocated resource.

12. The device according to claim 11, wherein the simulating unit is configured for simulating the data flow of the service of the UE by:
randomly determining a time interval for transmitting a real-time service in a Transmission Time Interval TTI, and randomly determining an amount of data transmitted in the time interval; and
determining, in accordance with a random distribution, an amount of data transmitted for a non-real-time service in a TTI.

13. The device according to claim 11, wherein the scheduling unit is configured for scheduling the UE in the access queue by:
preferentially scheduling, in accordance with the allocated resource, a UE with a high service priority in UEs with different service priorities in the access queue; and scheduling UEs with a same service priority in the access queue in accordance with the allocated resource and an amount of historical data of a UE, by preferentially scheduling a UE with a small amount of historical data.

14. The device according to claim 11, wherein the scheduling module further comprises:
a generating unit configured for generating distribution points of sample UEs in accordance with a preset cellular model;
a determining unit configured for determining an SINR for a sample UE at each of the generated distribution points; and
a selecting unit configured for selecting a determined SINR for the UE.

15. The device according to claim 11, wherein the network planning parameter comprises a station spacing in case of a known traffic or a traffic in case of a known station scale.

16. The device according to claim 15, wherein the processing module is configured for: when the station scale of the network is to be planned in case of the known traffic, determining whether the indicator of performing access scheduling on the UE in a network constructed according to the station spacing meets the requirement in network capacity planning; and
when the indicator meets the requirement, determining a target station spacing as the station spacing; otherwise when the indicator does not meet the requirement, adjusting the station spacing until the indicator meets the requirement in network capacity planning.

17. The device according to claim 15, wherein the processing module is configured for: when the traffic of the network is to be planned in case of the known station scale, determining whether the indicator of performing access scheduling on the UE in a network constructed according to the traffic meets the requirement in network capacity planning; and
when the indicator meets the requirement, determining a target traffic as the traffic; otherwise when the indicator does not meet the requirement, adjusting the traffic until the indicator meets the requirement in network capacity planning.

18. The device according to claim 11, wherein the indicator comprises at least one of a cell flow, a cell edge spectral efficiency, a service satisfaction rate, and a number of served users.

* * * * *